United States Patent
Bauer et al.

(10) Patent No.: US 7,069,712 B2
(45) Date of Patent: Jul. 4, 2006

(54) MOWER DECK WITH BLOWER

(75) Inventors: Brian Edward Bauer, Holly Springs, NC (US); Brian Charles Kelly, Apex, NC (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/873,365

(22) Filed: Jun. 21, 2004

(65) Prior Publication Data

US 2005/0279068 A1    Dec. 22, 2005

(51) Int. Cl.
*A01D 64/00*    (2006.01)
(52) U.S. Cl. .................................. 56/320.2; 56/12.8
(58) Field of Classification Search .............. 56/320.1, 56/320.2, 17.4, 6, 12.8
See application file for complete search history.

(56) References Cited

U.S. PATENT DOCUMENTS

| | | | | |
|---|---|---|---|---|
| 2,920,435 A | * | 1/1960 | Vallone ....................... | 56/13.3 |
| 2,957,295 A | | 10/1960 | Brown ........................ | 56/25.4 |
| 3,008,283 A | * | 11/1961 | Wood, Jr. .................... | 56/17.4 |
| 3,420,041 A | * | 1/1969 | Irgens ........................ | 56/320.2 |
| 4,081,947 A | | 4/1978 | Szymanis .................... | 56/13.3 |
| 4,114,353 A | | 9/1978 | Ansbaugh et al. ........... | 56/13.3 |
| 4,121,405 A | | 10/1978 | Wolf .......................... | 56/12.9 |
| 4,263,771 A | | 4/1981 | Iaboni et al. ................ | 56/13.4 |
| 4,407,112 A | | 10/1983 | Shepherd et al. ............ | 56/13.4 |
| 4,472,926 A | * | 9/1984 | Siegrist et al. .............. | 56/13.6 |
| 4,711,073 A | | 12/1987 | Freier et al. ................. | 56/13.3 |
| 4,765,127 A | * | 8/1988 | Hamblen ..................... | 56/295 |
| 4,781,665 A | | 11/1988 | Walker ........................ | 474/133 |
| 4,782,650 A | | 11/1988 | Walker ........................ | 56/16.6 |
| 4,835,951 A | | 6/1989 | Walker ........................ | 56/16.6 |
| 4,856,265 A | * | 8/1989 | Wolf ........................... | 56/320.2 |
| 4,916,887 A | * | 4/1990 | Mullet et al. ................ | 56/13.8 |
| 4,930,981 A | | 6/1990 | Walker ........................ | 415/119 |
| 5,012,633 A | | 5/1991 | Ito et al. ...................... | 56/12.9 |
| 5,064,315 A | | 11/1991 | Samejima et al. .......... | 406/100 |
| 5,142,851 A | | 9/1992 | Lydy et al. .................. | 56/13.4 |
| 5,157,908 A | | 10/1992 | Sebben et al. .............. | 56/320.1 |
| 5,224,327 A | | 7/1993 | Minoura et al. ............. | 56/13.3 |
| 5,398,491 A | * | 3/1995 | Hartley ....................... | 56/320.2 |
| 5,542,243 A | | 8/1996 | Yuki et al. ................... | 56/13.3 |
| 5,560,188 A | | 10/1996 | Murakawa et al. .......... | 56/13.3 |
| 5,669,212 A | | 9/1997 | Bening et al. ............... | 56/13.3 |
| 5,826,416 A | * | 10/1998 | Sugden et al. .............. | 56/320.2 |
| 5,832,708 A | * | 11/1998 | Sugden ....................... | 56/202 |

(Continued)

FOREIGN PATENT DOCUMENTS

CH    658 363 A5    11/1986

(Continued)

OTHER PUBLICATIONS

Walker MFG. CO.—Specifications.

*Primary Examiner*—Meredith Petravick (57) ABSTRACT

A mower deck includes a blower to lift blades of grass or vegetation for cutting. The blower may be mounted above and to the rear of the mower deck, and may rotate on a vertical axis spaced from the axes of the cutter blades. A passage or duct extends from the cutting chambers under the mower deck to the blower. Cutter blades may be used having essentially flat or planar surfaces to reduce noise, or the mower deck may be used with conventional blades. The mower deck may be configured with several alternative discharge modes, so that clippings and debris may be collected in a container, or may be dispersed to the rear or side of the mower.

21 Claims, 8 Drawing Sheets

U.S. PATENT DOCUMENTS

| | | | |
|---|---|---|---|
| 5,873,225 A | 2/1999 | Schaedler et al. | 56/13.3 |
| 5,960,616 A | 10/1999 | Schaedler et al. | 56/17.5 |
| 5,983,613 A | 11/1999 | Winter | 56/13.3 |
| 6,038,840 A * | 3/2000 | Ishimori et al. | 56/13.3 |
| 6,065,276 A | 5/2000 | Hohnl et al. | 56/320.1 |
| 6,073,430 A | 6/2000 | Mullet et al. | 56/13.4 |
| 6,148,595 A * | 11/2000 | Rabe et al. | 56/320.2 |
| 6,192,666 B1 | 2/2001 | Sugden et al. | 56/320.2 |
| 6,370,855 B1 | 4/2002 | Evans et al. | 56/320 |
| 6,434,918 B1 | 8/2002 | Csonka et al. | 56/13.4 |
| 6,609,358 B1 | 8/2003 | Schmidt et al. | 56/320.2 |
| 6,675,566 B1 | 1/2004 | Martignon | 56/13.3 |
| 2003/0024222 A1 | 2/2003 | Martignon | 56/6 |

FOREIGN PATENT DOCUMENTS

| | | |
|---|---|---|
| DE | 201 13 298 U 1 | 3/2002 |
| FR | 2 768 296 | 3/1999 |

* cited by examiner

MOWER DECK WITH BLOWER

FIELD OF THE INVENTION

This invention relates to mowers for cutting grass and other vegetation, and more specifically to a mower deck with a blower.

BACKGROUND OF THE INVENTION

Rotary mowers have one or more cutter blades mounted to generally vertical shafts, with the cutter blades positioned under a mower deck. Mower decks have been in existence for a number of years, and serve several functions including: (a) protection from rotating cutter blades; (b) protection from thrown clippings and debris; (c) providing an internal surface to promote the flow of air, clippings, and debris in a desired pattern or direction; and (d) mulching of clippings and debris.

Rotary mowers are productive and cost-effective for cutting grass or vegetation, but may generate significant noise. Noise from the mower deck and cutter blades may be caused by turbulent air coming off each blade as it passes through the air under the deck and creates a broadband sound. Additionally, interactions between two or more cutter blades rotating adjacent and in close proximity to each other may result in significant noise, at least in part due to interactions between shapes or irregularities of the blade surfaces.

Noise from the cutter blades may be generated at least in part by the "wing" or "lift" component of the mower blades, a feature which helps lift grass or vegetation off the ground surface. Better lift may result in a better quality of cut and better dispersion of clippings, but also may result in greater noise.

Another source of rotary mower noise may be a fan or blower. Fans or blowers proposed for use on grass mowing equipment may have several different functions. For example, U.S. Pat. Nos. 4,114,353, 5,224,327, 5,542,243, 6,192,666 and 6,675,566 relate to lawn mowers with fans to help blow clippings through a discharge chute into a hopper or grass catcher. U.S. Pat. No. 4,121,405 relates to a rotating disc mounted on a common shaft with a flat rotary cutter blade, the disc having vertical vanes for establishing an air current. U.S. Pat. No. 5,012,633 relates to a lawn mower having a flat cutter blade intended to reduce or minimize wind noise, and also having a discharge fan concentric or nearly concentric with the vertical axis of the cutter blade. U.S. Pat. Nos. 5,873,225 and 5,960,616 relate to rear discharge decks positioned extremely close to the ground, with a radial fan formed integrally with the spindle of the cutting blade and opening near a discharge chute. U.S. Pat. No. 6,073,430 relates to a rotary mower having a fan chamber concentrically positioned over a cutter blade chamber to provide additional suction and to exhaust clippings through an exhaust passage over the deck.

In recent years, there has been a greater need to reduce noise generated by grass mowing equipment. For example, efforts have been made to reduce noise from internal combustion engines that drive mowers and/or cutter blades. Alternative power sources have been substituted in place of internal combustion engines to help reduce the noise level of mowing operations. A mower deck is needed that will produce less noise, without sacrificing quality of cut or dispersion of clippings.

Additionally, there is an increasingly greater need to collect clippings or vegetation from a mower, or to direct discharged material to a desired location with respect to the mower. A mower deck is needed that will provide two or more discharge configurations, without interfering with the power source and linkages that drive the cutting blades.

Mower operators need to be able to view the mower deck, especially when mowing around obstacles and other objects that should be avoided. Better visibility of the mower deck helps the mower operate safely. A mower deck is needed that will produce less noise and/or have multiple discharge configurations, without blocking an operator's view of the mower deck.

SUMMARY OF THE INVENTION

A blower is mounted on a mower deck, the blower having a spindle or shaft with an axis behind the axis of each rotary cutting blade spindle. The blower moves air and grass clippings from an inlet under the front of the deck to an outlet above and behind the cutting chambers. The outlet of the blower may be pivoted to permit several alternative discharge modes. For example, the blower may direct clippings and debris into a container, or to the rear or side of the mower.

The mower deck with a blower may be used with or without cutter blades having "wing" or "lift" components. The blower makes it unnecessary for cutter blades to also lift the grass or vegetation. As a result, it may be possible to use a cutter blade or blades having an essentially flat or planar surface to reduce or minimize noise.

DESCRIPTION OF THE PREFERRED EMBODIMENT

The mower deck with a blower may be used in a variety of different mowing vehicles or walk-behind mowers, and in a variety of different mower configurations. For example, one, two, or more mower decks may be attached to a mowing vehicle. Each mower deck may be a single-chamber deck or a multi-chamber deck and may be positioned at or adjacent the front, middle, or rear of a mowing vehicle.

Figure 1:
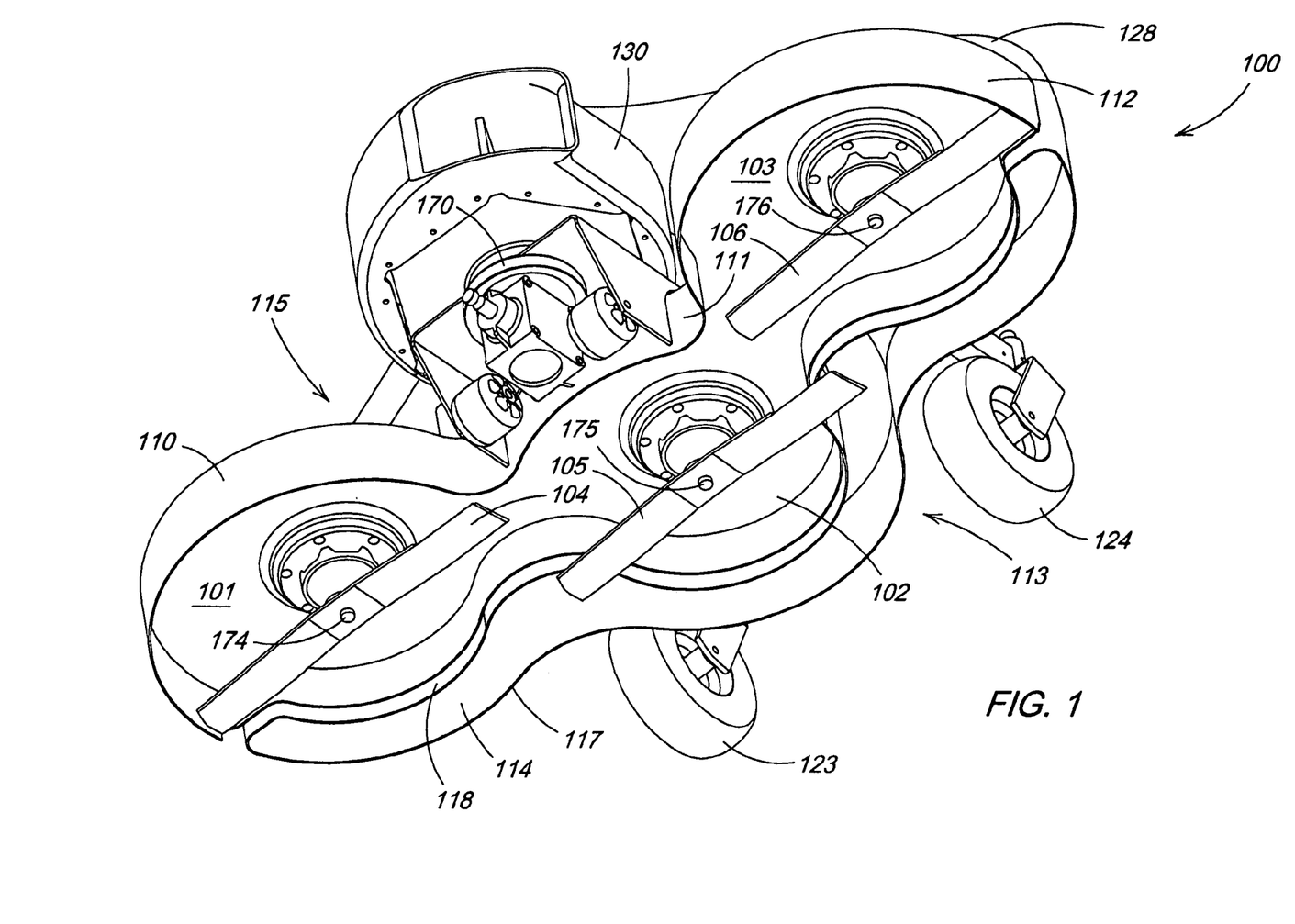
FIG. 1 is a bottom rear perspective view of a first embodiment of a mower deck with a blower, and a passage extending from an inlet below the deck to a rearwardly positioned outlet.

In a first embodiment shown in FIG. 1, mower deck 100 may house three rotary cutting blades 104, 105, 106 in cutting chambers 101, 102, 103. Passages or openings may exist between adjacent cutting chambers, so that air and/or cut grass or vegetation may pass between the cutting chambers. The mower deck may have a front 113 and rear 115.

The rotary cutting blades may be mounted to vertically oriented spindles driven by a belt or other linkage to an internal combustion engine or other power supply (not shown).

In one embodiment, cutting chambers 101, 102, 103 may have top panels 107, 108, 109 as shown in FIGS. 2a, 2b, 2c and 4. Skirts 110, 111, 112 may extend downwardly from the outer edges of the top panels. At least part of the skirt may define a generally cylindrical shape of a cutting chamber, and at least part of the skirt may be joined to an adjacent skirt of another cutting chamber. The skirts may extend downwardly from the top panels to a height at or below the generally horizontal plane of the rotary cutting blades.

In one embodiment, inlet 114 may be located under the mower deck adjacent front 113. Preferably, at least part of the inlet may be above the horizontal plane of the cutter blade or blades. In one embodiment, inlet 114 may have the shape of one or more arcs, each arc extending about 30 degrees to about 240 degrees around the perimeter of a cutting chamber at or adjacent front 113.

In one embodiment, inlet 114 may be defined between a pair of generally parallel walls, i.e., first wall 117 and second wall 118. First wall 117 may extend at least partially around front 113 of mower deck 100, and second wall 118 may be spaced between about one inch and about five inches from first wall 117. First wall 117 may extend downwardly from the top panel or panels to a height at or below the generally horizontal plane of the rotary cutting blades. Second wall may extend downwardly from the top panel or panels to a height above the plane of the rotary cutting blades, and preferably between about one-half inch and about two inches above the plane of the rotary cutting blades.

In one embodiment, passage or duct 128 may extend from inlet 114, through the top panels, to outlet 129. Outlet 129 may be connected to blower 130. The blower may be a radial flow fan rotating on a generally vertical axis, and should provide sufficient air flow to lift grass or other vegetation off the ground to the horizontal plane of the cutter blades. The vertical axis of the blower spindle or shaft is not concentric with the vertical axes of any rotary cutting blade spindle, but is spaced rearwardly of the axis of each rotary cutting blade spindle.

Blower 130 may be acoustically designed to generate minimal noise. For example, in one embodiment, blower 130 may be a belt driven centrifugal blower with a capacity of between about 2,000 CFM and about 10,000 CFM. Blower 130 may have a plurality of fan blades attached to the generally vertically oriented shaft or spindle. The blades may be constructed from a tough and durable material such as high molecular weight polyethylene, and may be spaced at irregular intervals.

As shown in FIG. 1, in one embodiment, a belt may connect between pulley 170 on the shaft of blower 130 and one or more of the rotary cutter blades, so that the blower and cutter blades may be operated together. For example, a first V-belt may be around a first pulley on the blower shaft and pulleys on one or more rotary cutter blade spindles, and a second V-belt may be around a second pulley on the blower shaft and a clutching device.

In another embodiment, blower 130 may be engaged independently from the rotary cutter blades. For example, a first V-belt may be around a first pulley on the blower shaft and a clutching device, and a second and/or third V-belt may be around the pulleys on each rotary cutter blade spindle and an independent clutching device. In this embodiment, when the blower is off, the rotary cutting blades may be used to cut and mulch, for example.

Figure 2A:
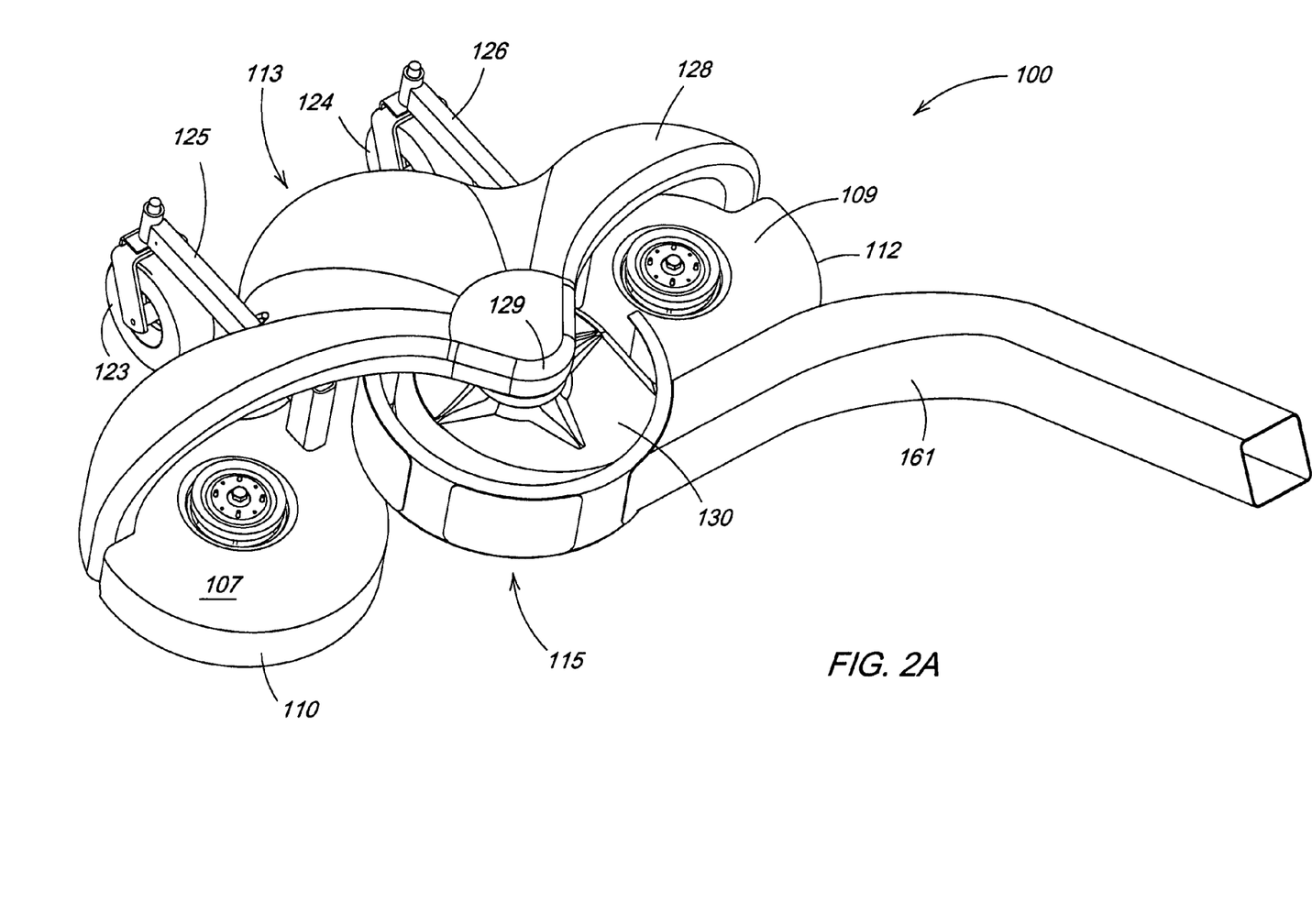
FIG. 2A is a top rear perspective view of the mower deck of FIG. 1, with the passage outlet in the collection mode
Figure 2B:
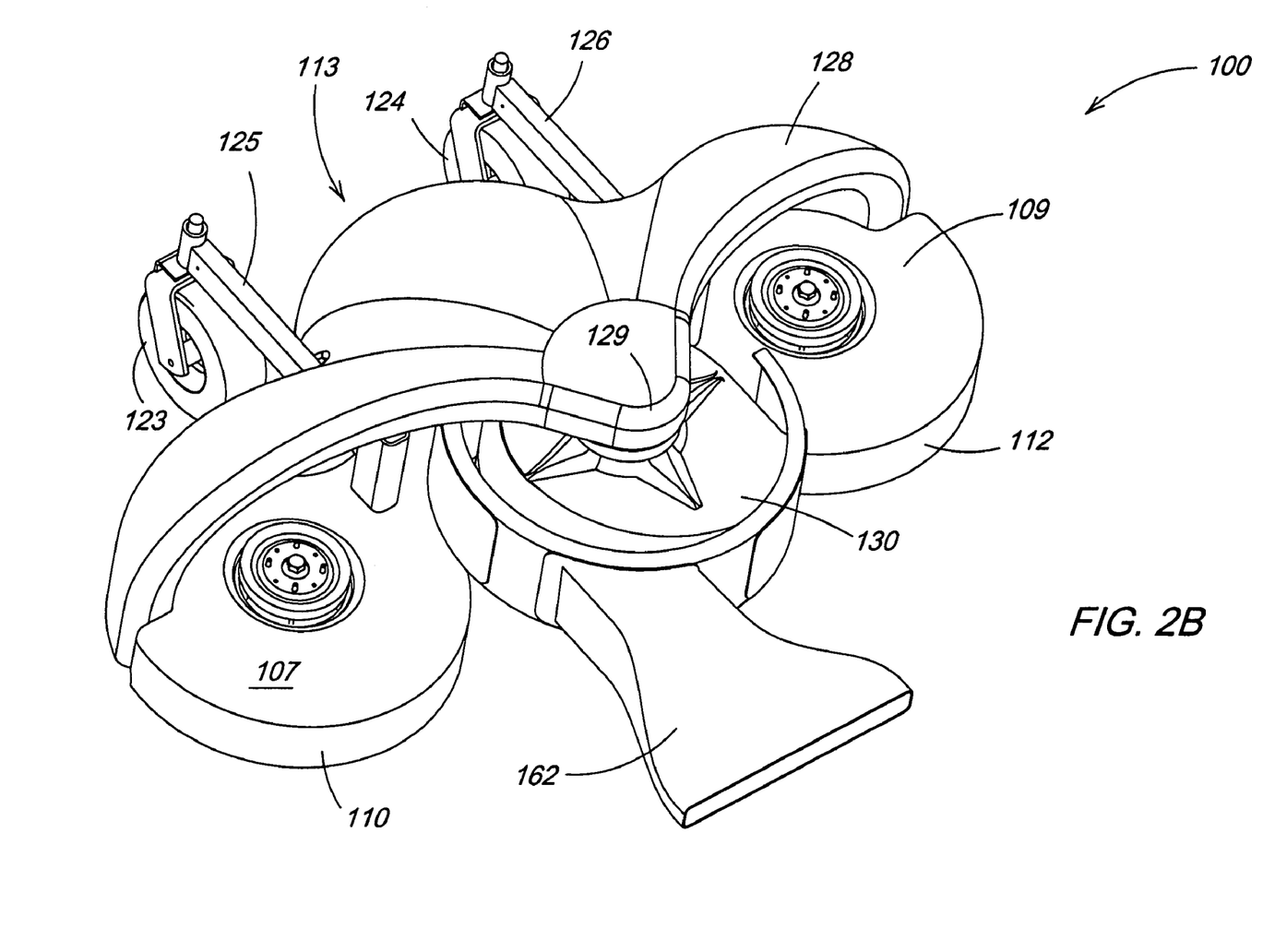
FIG. 2B is a top rear perspective view of the mower deck of FIG. 1, with the passage outlet in the rear discharge mode.
Figure 2C:
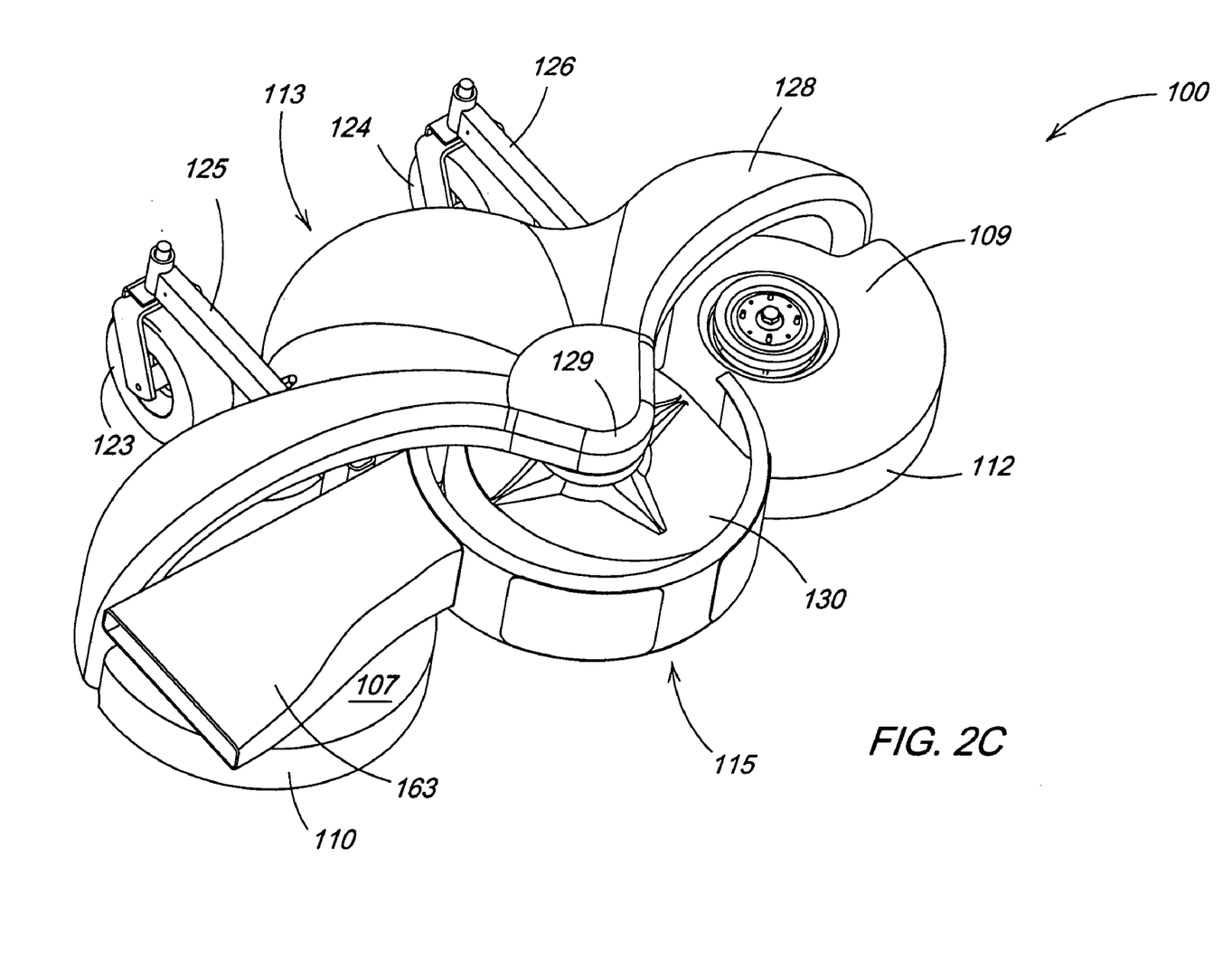
FIG. 2C is a top rear perspective view of the mower deck of FIG. 1, with the passage outlet in the side discharge mode.
Figure 3:
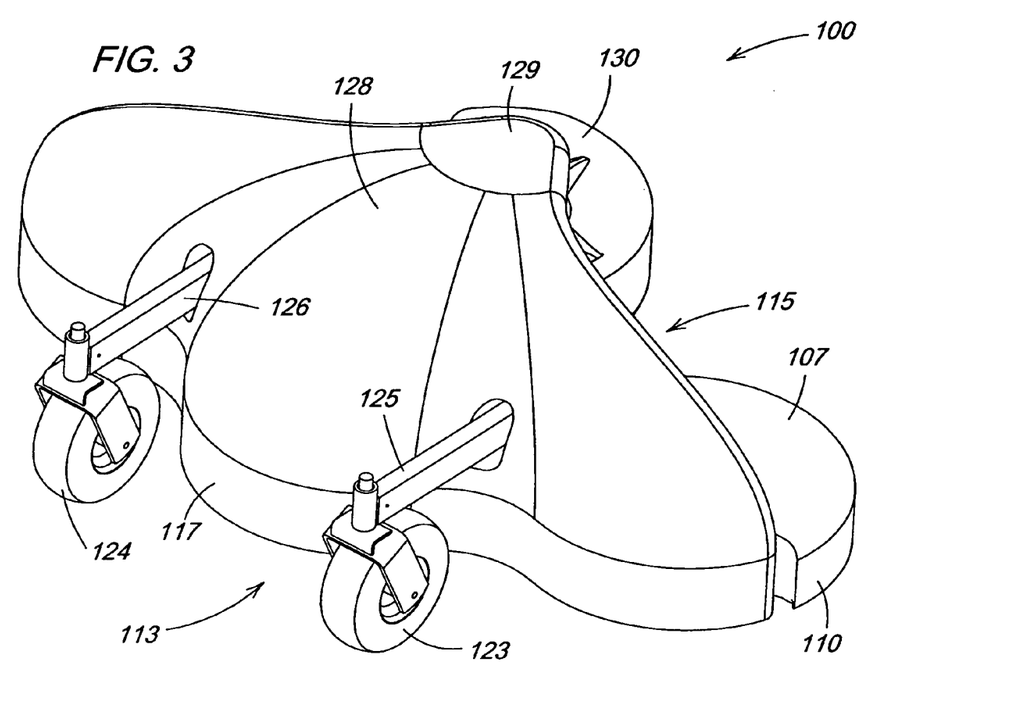
FIG. 3 is a top front perspective view of the mower deck of FIG. 1.
Figure 4:
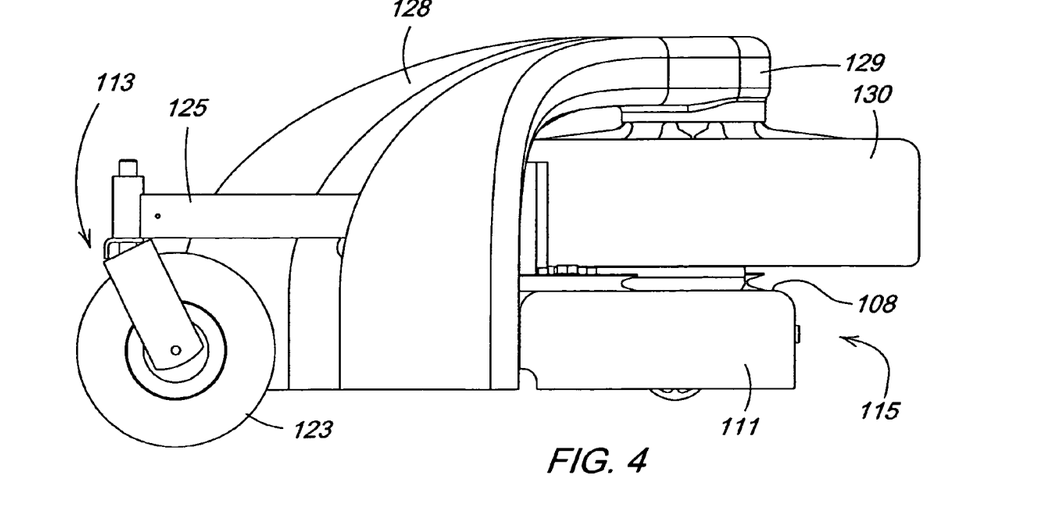
FIG. 4 is a left side view of the mower deck of FIG. 1.

In one embodiment, blower 130 may be selectively connected in one of several discharge modes to distribute or disperse clippings in a desired manner. For example, as shown in FIG. 2A, the blower may direct clippings to chute 161 which may be attached to a container or bag (not shown). In FIG. 2B, the blower may direct clippings to chute 162 facing the back or rear of the mower deck. In FIG. 2C, the blower may direct clippings to chute 163 facing the left or right side of the mower deck. In one embodiment, blower 130 may pivot so that it may be selectively pivoted or turned to each of the alternative positions to provide each of the desired discharge modes. For example, the blower may include a housing that is pivotally mounted to the top of the mower deck.

In one embodiment, a restrictive nozzle (not shown) may be inserted or connected to the end of a discharge chute to provide a blowing capability. The nozzle may be used to provide airflow at a sufficiently high velocity to blow clippings or other debris off ground surfaces.

In one embodiment, one or more wheels may be mounted to the mower deck to support the mower deck, adjust the height of cut, and/or prevent the mower deck from becoming too close to the ground when traveling over uneven portions thereof. In one embodiment, wheels 123, 124 may be mounted to arms 125, 126 which extend from front 113.

Figure 5:
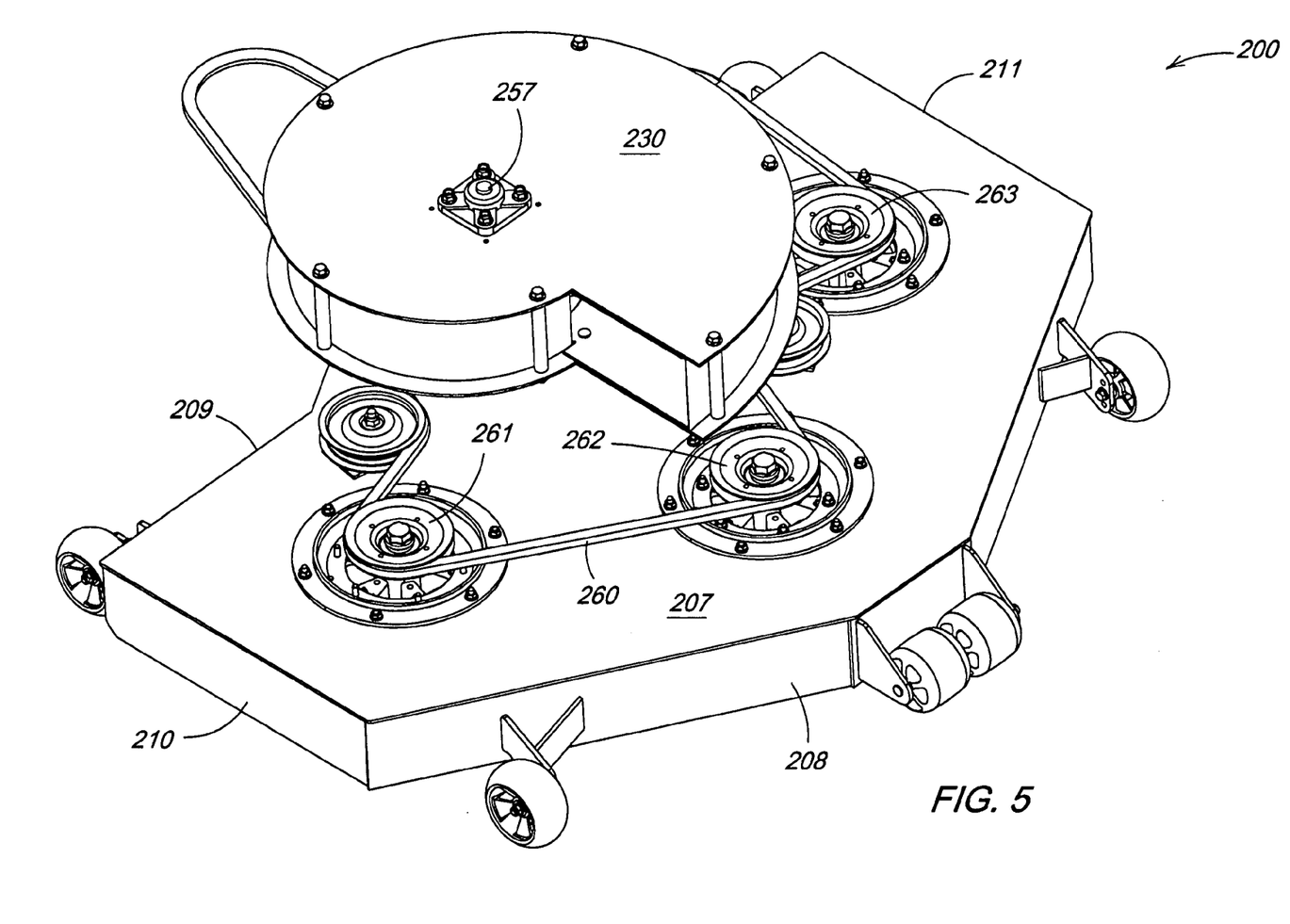
FIG. 5 is a top front perspective view of a second embodiment of a mower deck with a blower.
Figure 6:
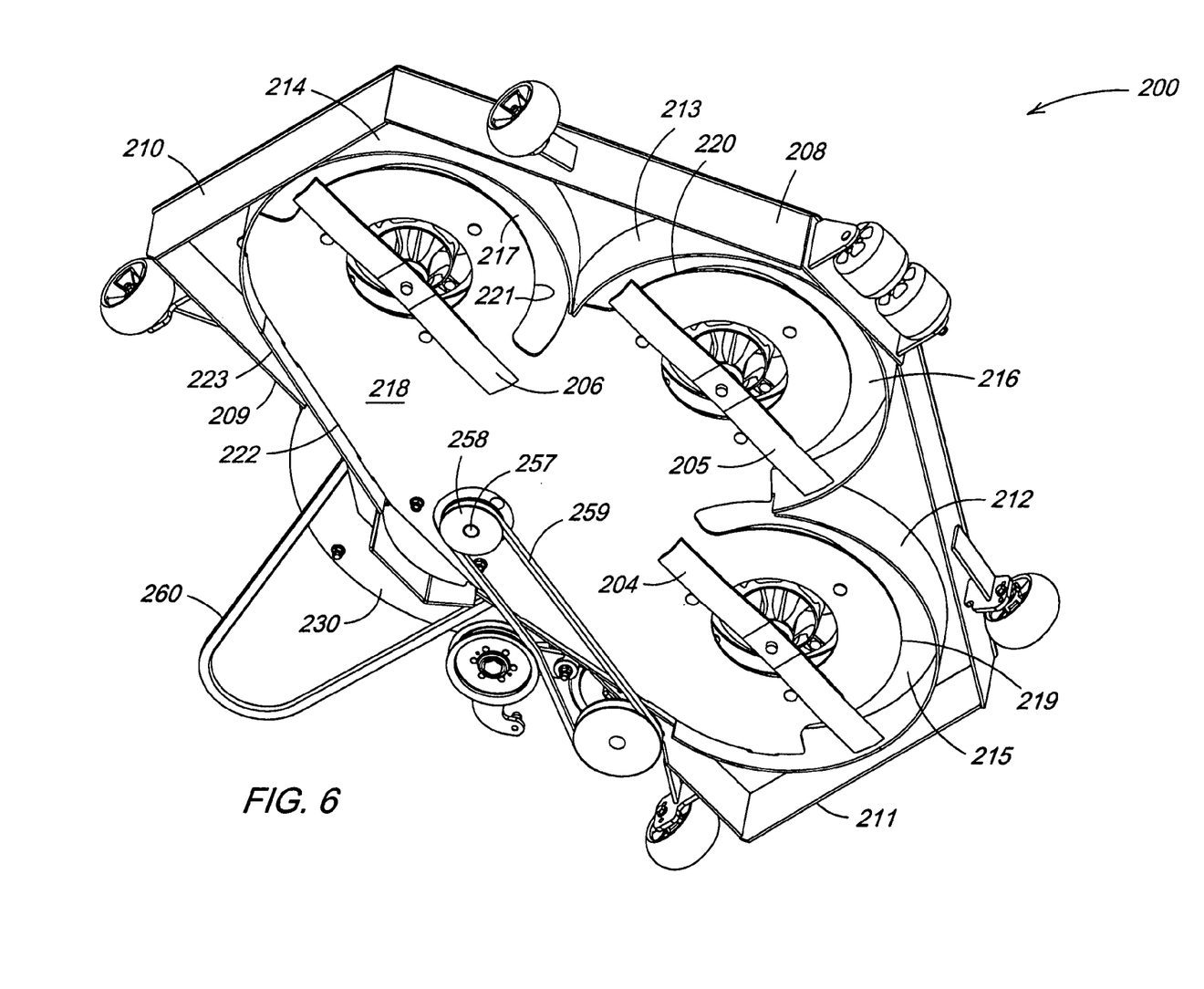
FIG. 6 is a bottom perspective view of the mower deck of FIG. 5.
Figure 7:
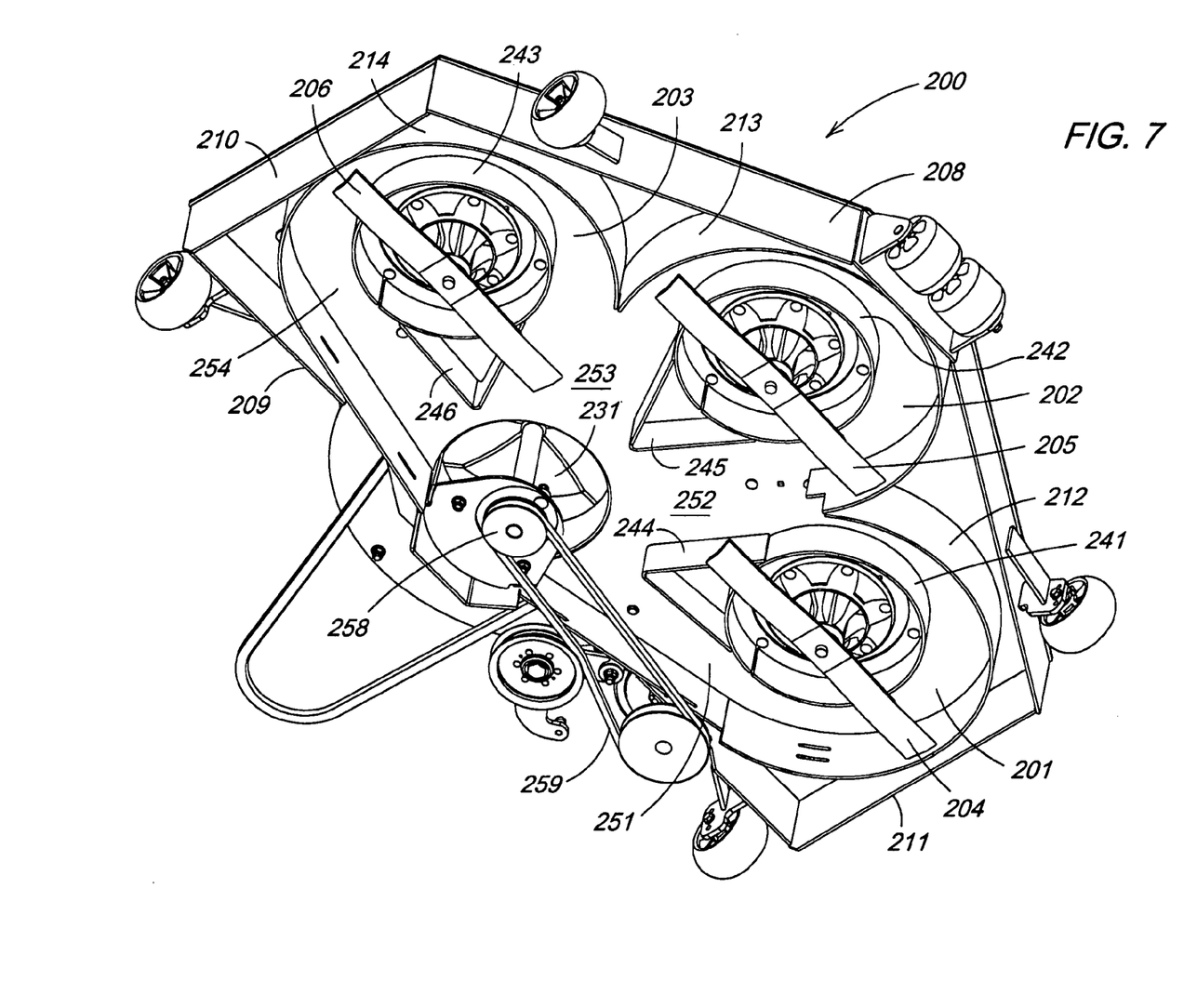
FIG. 7 is a bottom perspective view of the mower deck of FIG. 5, with horizontal plate 218 removed.

In a second embodiment shown in FIGS. 5, 6 and 7, mower deck 200 may house cutting blades 204, 205, 206 in cutting chambers 201, 202, 203. Air and/or cut grass or vegetation may pass between the cutting chambers. The cutting chambers may be under top panel 207, front 208, rear 209, and sides 210, 211.

Cutting chambers 201, 202, 203 may have skirts 212, 213, 214 extending downwardly from top panel 207. At least part of each skirt may define a generally cylindrical shape of each cutting chamber, and at least part of each skirt may be joined to an adjacent skirt. The skirts may extend downwardly from the top panel to a height at or below the generally horizontal plane of the rotary cutting blades.

In the embodiment of FIGS. 5, 6 and 7, cutting chambers 201, 202, 203 may have inlets 215, 216, 217. Each inlet may form an arc extending about 30 degrees to about 240 degrees around the perimeter of a cutting chamber. For example, inlets 215, 216, 217 may be between skirts 212, 213, 214 respectively and horizontal plate 218. Horizontal plate 218 may be attached parallel to, and positioned about one inch to about five inches below top panel 207, at a height above the horizontal plane of the cutting blades.

Front edges 219, 220, 221 of horizontal plate 218 may face front edge 208 of top panel 207, and may have one or more arced edges spaced about one inch to about five inches from skirts 212, 213, 214. Rear edge 222 of horizontal plate 218 may abut skirt 223 and/or rear edge 209. Cylindrical walls 241, 242, 243, each of which may encircle a spindle of a rotary cutting blade, may extend about one inch to about five inches downwardly from top panel 207, and may help support horizontal plate 218. Additionally, baffles 244, 245, 246 may be joined to walls to help direct flow of air and clippings through passages 251, 252, 253, 254 and to opening 231.

In the embodiment of FIGS. 5, 6 and 7, blower 230 may be mounted on the top panel 207 over opening 231. Opening 231 may be at or near rear 209 of the mower deck. Blower 230 may be a radial flow fan rotating on a generally vertical axis, and should provide sufficient air flow to lift grass or other vegetation off the ground to the horizontal plane of the cutter blades and into the fan housing. The vertical axis of the blower spindle is not concentric with the vertical axes of any rotary cutting blade spindle, but may be to the rear of the cutting blade spindles. Spindle or shaft 257 of the blower may have pulley 258 mounted thereto, and may be driven by belt 259. Belt 260 may be around pulleys 261, 262, 263 on the spindles of the cutter blades, and to a power supply (not shown).

Although the present invention may be used with conventional cutter blades, cutter blades also may be used that have essentially flat or planar surfaces with minimal or no "wing" or "lift" component. Absent a "wing" or "lift" component, the cutter blades may generate significantly reduced noise during mowing operations, and may provide minimal if any grass lifting function.

Additionally, in one embodiment, the leading edges and trailing edges of both ends of a cutter blade may be sharpened to reduce or minimize noise generated during mowing operations. Sharpening both edges on each end of the cutter blade may allow the cutter blade to be re-used by flipping the blade over and using the sharpened trailing edges for cutting. Making use of both edges may double or greatly extend the useful life of a cutter blade.

The blower position behind the cutter blade spindles, in the first or second embodiments, enables clippings to be discharged to the rear of the mower deck, or to each side of the deck, or to a collection container. In this position, the blower may be driven by the same belt or other linkages as the cutter blades, without interfering with the power source, belts, or other linkages. Additionally, the blower may have side or rear discharge ducts on the top rear surface of the mower deck, without increasing the length of the mower vehicle or deck, and without blocking the operator's view of the front of the mower deck.

In one embodiment of the invention, the inlet or inlets are positioned directly over the point at which the blades of grass are cut. The blower may provide sufficient suction pressure and air flow to lift and transport the grass blades to the outlet of the duct. Thus, in one embodiment, cutter blades with a lift component are not needed to perform the lifting or transport functions. For example, the wing of the cutter blade may be very low or zero, to reduce noise generated by the mower. Grass clippings under each cutting chamber move between about six inches and about 15 inches from each cutting chamber into an inlet. Preferably, the travel distance for cut grass blades may be about equal for each cutting chamber.

Having described the preferred embodiment, it will become apparent that various modifications can be made without departing from the scope of the invention as defined in the accompanying claims.

The invention claimed is:

1. An apparatus comprising:
   a mower deck having a top panel over a plurality of cutting chambers and housing a plurality of rotary cutter blades, the cutter blades rotating on generally horizontal planes and mounted to spindles having generally vertical axes;
   a blower mounted to a spindle having a generally vertical axis rearwardly of the generally vertical axes of the rotary cutter blade spindles; and
   passages between each cutting chamber and the blower, each passage including an opening through the top panel over each cutting chamber to an outlet above the top panel connected to the blower.

2. The apparatus of claim 1 further comprising a plurality of discharge chutes selectively connectable to the blower.

3. The apparatus of claim 1 wherein the blower comprises a fan in a housing that may be pivoted to a plurality of positions.

4. The apparatus of claim 1 wherein the rotary cutter blade is completely flat.

5. The apparatus of claim 4 wherein the rotary cutter blade has sharp trailing edges.

6. The apparatus of claim 1 wherein each cutting chamber has a perimeter, the inlets in a portion of the perimeter of each cutting chamber forming arcs.

7. An apparatus comprising:
   a mower deck having a top panel, a front, a rear, and a plurality of generally cylindrical cutting chambers under the top panel;
   a blower mounted over the top panel adjacent the rear of the mower deck; and
   ducts having inlets through the top panel into each of the cutting chambers and extending partially around the perimeter of each cutting chamber adjacent the front of the mower deck, and extending to an outlet over the rear of the mower deck and connected to the blower.

8. The apparatus of claim 7 further comprising a plurality of rotary cutter blades, each cutter blade mounted on a generally vertical spindle with a pulley attached thereto, and a blower shaft with a pulley attached thereto.

9. The apparatus of claim 8 wherein the blower and the cutter blades are independently driven.

10. The apparatus of claim 7 further comprising a discharge chute from the blower.

11. The apparatus of claim 7 wherein each inlet extends at least partially around the perimeter of each cutting chamber in a plurality of arcs of between about 30 degrees and about 240 degrees.

12. The apparatus of claim 7 wherein each inlet extends below the top panel of the mower deck.

13. The apparatus of claim 7 wherein the blower comprises a fan in a housing, both of which are pivotable on a generally vertical axis to a plurality of discharge modes.

14. An apparatus comprising:
   a rotary mower having a deck with a front, rear and sides, the deck housing a plurality of cutter blades mounted to spindles having vertical axes;
   a blower pivotably mounted above the deck;
   a plurality of passages from under the front of the deck and extending through openings in the deck above each cutter blade to an outlet at the blower; and
   the blower having a housing with a fan mounted in the housing and being pivotable to discharge toward either the side or rear of the deck.

15. The apparatus of claim 14 further comprising a plurality of discharge chutes connectable to the blower, the plurality of discharge chutes including a collection chute, a rear discharge chute, and a side discharge chute.

16. The apparatus of claim 14 wherein the blower has a generally vertical axis positioned behind the generally vertical axes of the spindles of the cutter blades.

17. The apparatus of claim 14 wherein the deck further comprises a top panel and a plurality of skirts extending downwardly from the top panel.

18. The apparatus of claim 17 further comprising a stationary horizontal panel parallel to the top panel, the horizontal panel spaced between the top panel and the cutter blades.

19. The apparatus of claim 14 further comprising a first belt to drive the cutter blades, and a second belt to drive the blower.

20. The apparatus of claim 14 wherein the inlet forms a partial circle of between about 30 degrees and about 240 degrees around each cutter blade.

21. The apparatus of claim 15 further comprising a discharge nozzle connectable to a discharge chute.

* * * * *